March 25, 1969 A. W. PALMER 3,434,724

MECHANISM TO OBTAIN GAP BETWEEN RECORDINGS ON A TAPE RECORDER

Filed April 17, 1967 Sheet 1 of 2

Inventor,
Ansell W. Palmer,
by Francis K. Doyle
His Attorney.

Inventor,
Ansell W. Palmer,
by Francis K. Doyle
His Attorney.

3,434,724
MECHANISM TO OBTAIN GAP BETWEEN RECORDINGS ON A TAPE RECORDER

Ansell W. Palmer, Hampton, N.H., assignor to General Electric Company, a corporation of New York
Filed Apr. 17, 1967, Ser. No. 631,244
Int. Cl. G11b *5/10*
U.S. Cl. 274—4 5 Claims

ABSTRACT OF THE DISCLOSURE

A mechanism of obtaining a gap between adjacent recordings on a tape recorder while maintaining constant velocity of the tape drive. A pair of tape guides on opposite sides of the write head are mounted on a rocker member which carries a cam follower, the rocker member being spring mounted to press the cam follower against a rotating cam. The rotating cam has a drop point timed for the end of each recording, which causes the rocker member to rock abruptly about a pivot point causing the guides to pull the tape across the write head providing the desired gap. The cam slowly returns the rocker member to its first position during the following recording section from which it is again ready to rock to provide a further gap at the end of the next recording.

BACKGROUND OF INVENTION

This invention relates to tape recorders and more particularly to a mechanism to provide a gap between adjacent recordings on a tape recorder.

As is well known in this art, magnetic tape recorders are frequently used to record digital or other information on magnetic tape. These tapes are often later used to operate the various types of computers which will perform various functions on the information received from the magnetic tape. One example of this type of recording is the recording of the use of electricity from a plurality of electrical meters on a periodic basis. After each recording of the readings of the plurality of meters it is desirable to provide a definite blank space on the tape before beginning the next set of readings. However, there is usually only a very short time between each recording and this time period is not sufficient to provide a desired blank space, or gap between the recordings at the standard tape speed. Further, it is very difficult to change the speed of the tape drive during the brief interval available between recordings, and then to return the tape drive to the standard recording speed. Thus, there is presently a great need in the recording field for a means to provide a desired space or gap between adjacent recordings on a tape and still maintain the proper recording tape drive during the recordings. It is considered desirable to provide such a gap means which will not change the standard tape recording drive to prevent opportunitties for errors in subsequent recordings.

It is therefore one object of this invention to provide a mechanism for use in tape recorders which will provide a desirable gap or space between adjacent recordings on a tape.

A further object of the invention is to provide a gap mechanism which may be varied to provide a gap between recordings of different lengths.

A still further object of this invention is to provide a gap mechanism which will give a desirable gap between adjacent recordings without changing the tape recording speed.

SUMMARY OF INVENTION

Briefly in one form, this invention provides a gap mechanism for obtaining desirable spacing or gaps between adjacent recordings of the tape of a tape recorder. The gap mechanism comprises a pair of tape guide rollers which are spaced on opposite sides of the recording or writing head. The tape guide rollers are mounted on each end of a rocker member. The rocker member is provided with a cam follower and is spring mounted to cause the cam follower to engage a rotating cam. The rotating cam has a sharp drop therein timed to reach the cam follower at the end of each recording section. The cam follower drops along the cam, rocking the rocker member about a pivot point causing the tape guide rollers to move the tape across the write head to provide the necessary gap at the end of a recording.

The invention which is sought to be protected will be particularly pointed out and distinctly claimed in the claims appended thereto. However, it is believed that this invention and the manner in which its objects and advantages are obtained, as well as other objects and advantages thereof, will be more readily understood by reference to the following detailed description of preferred embodiments thereof particularly when considered in the light of the accompanying drawings.

DESCRIPTION OF PREFERRED EMBODIMENTS

This invention relates to a gap mechanism for providing a gap or space between adjacent recordings on a tape of a tape recorder. It is shown and described according to the present preferred embodiments. However, it will be apparent that various changes may be made in such embodiments, as described, without departing from the scope of the invention herein defined.

Figures 1, 2:
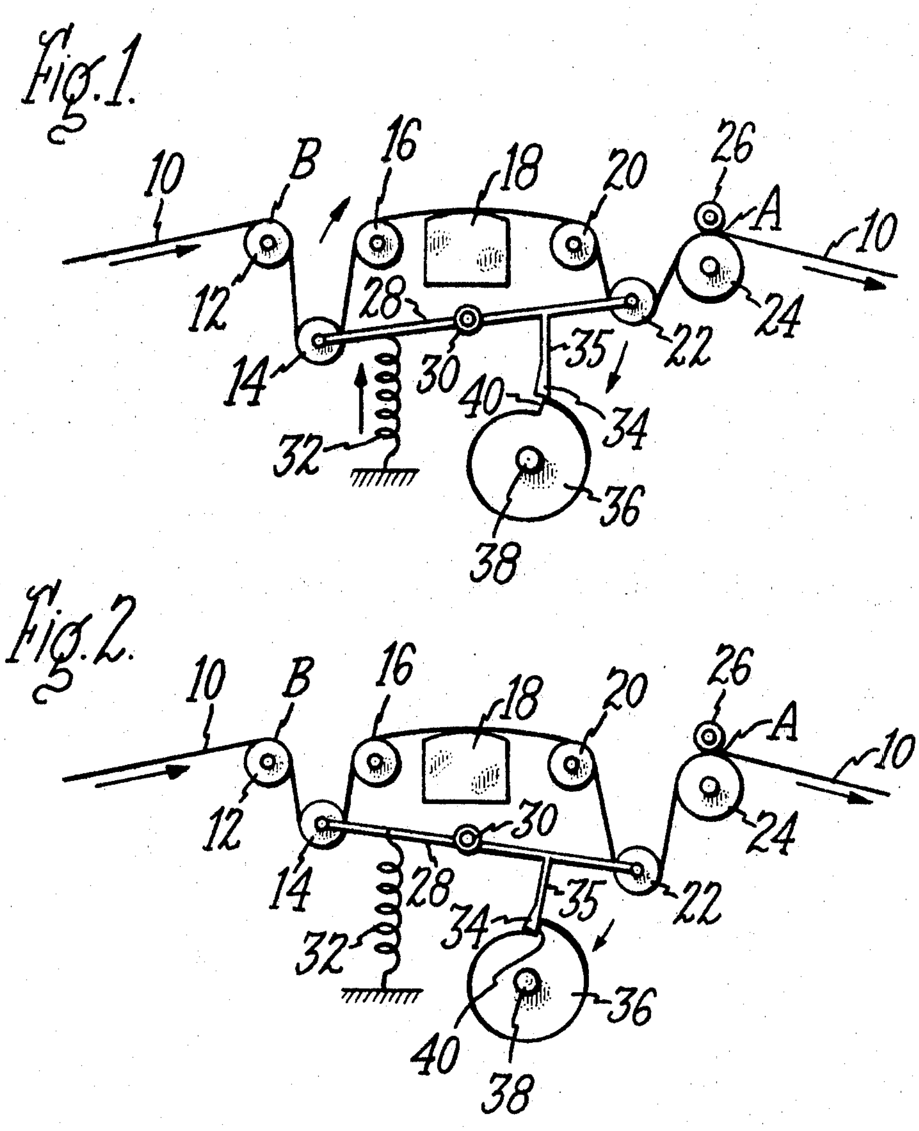
FIGURE 1 is a diagrammatic plan view of a portion of a tape recorder showing one preferred form of gap mechanism, according to this invention, incorporated therein.
FIGURE 2 is a plan view similar to FIGURE 1 of the form of preferred gap mechanism as shown in FIGURE 1 with the parts in a second position.

Referring now to the drawings in which like numerals are used to indicate like parts throughout the various views and considering first FIGURE 1, there is shown diagrammatically a plan view of a portion of a tape recorder with one preferred form of gap mechanism, according to this invention, incorporated therein. As shown in FIGURE 1, a tape recorder has a tape 10 which is entrained over a plurality of guide rollers 12, 14 and 16 to a tape writing or recording head 18. Tape 10 is then entrained over the guide rollers 20, 22 and through a driving member 24 having a pressure roller 26 cooperating therewith. As will be understood, tape 10 comes from a tape reel (not shown) over the guide rollers 12, 14 and 16 to the write head 18 where information is recorder thereon, usually by means of magnetic impulses. The driving member 24 is operated by a motor (not shown) to pull the tape 10 over write head 18 at a desired speed. The recorded tape is then stored in another tape reel (not shown). The means of driving the tape and recording information thereon are well known and, since they form no part of this invention, will not be further described.

In accordance with this invention, a gap mechanism is provided on the tape recorder to obtain desired spacing between adjacent recordings on the tape 10. In FIGURE 1 the gap mechanism is shown as including a rocker member 28 which is pivotally mounted on a shaft or bearing 30 secured to the tape recorder in any desired manner. Rocker member 28 is provided with a spring 32, one end of which is secured to the rocker 28 on one side of bearing or shaft 30, as shown. The other end of spring 32 is secured to the tape recorder. Spring 32 in the embodiment shown in FIGURE 1 is a compression spring, although it will be clear that a tension spring could be used if desired, although obviously such tension spring would be mounted in a different manner.

Rocker member 28 also includes a cam follower 34 which is mounted on rocker member 28 by an arm 35. The cam follower 34 rides on a cam 36. Cam 36 is rotatably mounted on the tape recorder such as by a shaft 38 and is driven in any desired manner by a tape recorder driving means. As shown in FIGURE 1, cam 36 preferably has a substantially spiral contoured periphery with a sharp drop as indicated at 40. The cam 36 is driven so as to complete one revolution for each recording of the tape 10. The drop 40 of cam 36 will reach the position shown in FIGURE 1 with respect to cam follower 34 at the end of each recording on tape 10. As will be apparent, spring 32 pushes rocker member 28 about bearing 30 keeping cam follower 34 in contact with cam 36.

Also mounted on rocker member 28 are a pair of tape guide rolls 14 and 22. Each guide roller 14 and 22 is spaced on an opposite side of the write head 18, and each is rotatably mounted on opposite ends of rocker member 28. As will be apparent, rocking or pivoting of rocking member 28 in a clockwise direction will lift guide roller 14 and lower guide roller 22. This movement of guide rollers 14 and 22 will rapidly move tape 10 forward over write head 18 without changing the driving speed of tape 10 through the driving means 24, 26.

FIGURE 2 shows the position of the gap mechanism after it has moved tape 10 forward over write head 18. As can be seen in FIGURE 2, guide rollers 12, 16 and 20, write head 18 and driving means 24, 26 are in the same position as shown in FIGURE 1. Further, since tape 10 is driven through drive means 24, 26 it will be clear that tape 10 has not significantly advanced through driving means 24, 26 during the shift in rocker member 28 from the position in FIGURE 1 to the position in FIGURE 2. Thus point A on tape 10 in FIGURE 1 is substantially the same as point A on tape 10 in FIGURE 2. However, as is apparent from FIGURE 2, cam follower 34 has dropped over the drop 40 of cam 36 allowing spring 32 to rock the rocker member 28 about the bearing 30. As shown in FIGURE 2, tape guide 14 has been raised a given distance as caused by drop 40 while tape guide 22 has been lowered or dropped the same distance. Tape 10 has been pulled over the write head 18 a length which is equal to twice the distance of the drop of guide roller 22. This will be clear since point A on tape 10 remains in substantially the same position during the advance of tape 10 over the write head 18. Of course, it will be obvious that the raising of guide roller 14 has released this length of tape 10 for advancement. Therefore, point B on tape 10 at guide 12 has remained in substantially the same position in FIGURES 1 and 2 in the advancement of tape 10 over the write head 18. This rapid advance of tape 10 over write head 18 occurs without in any way changing the driving speed of drive means 24, 26.

During the next recording interval, cam 36 will be continuously driven, as earlier mentioned, for one rotation for each recording on the tape 10. As cam 36 rotates about the shaft 38, the spiral shaped contour of its periphery will gradually rock rocker member 28 back into the position shown in FIGURE 1. Since cam 36 is driven at one revolution for each recording on the tape 10, the rocker member 28 will have returned to the position of FIGURE 1 by the end of the following recording. The rocker member 28 will then be ready to advance tape 10 to provide the desired spacing between the next recordings.

Figure 3:
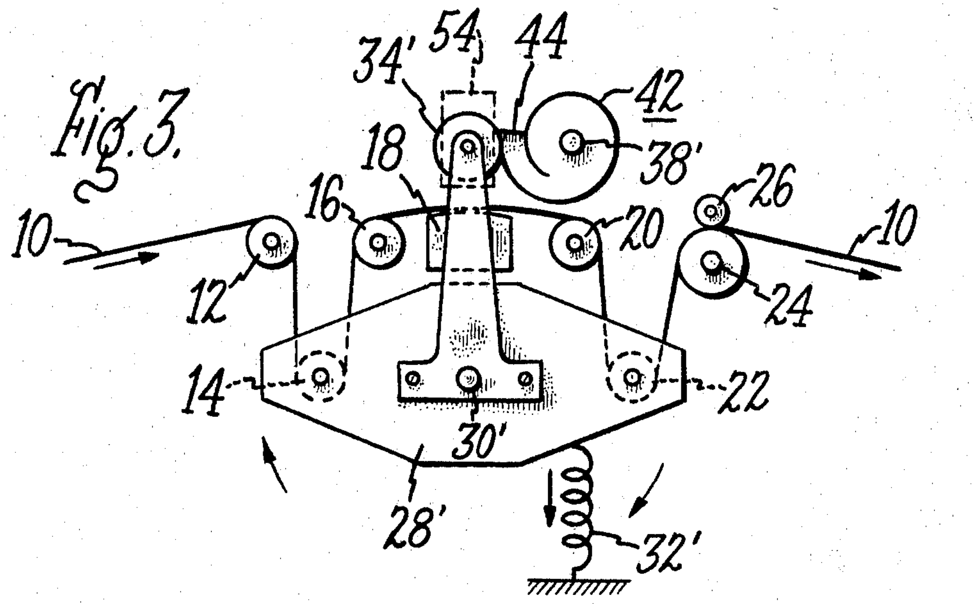
FIGURE 3 is a plan view of another preferred form of gap mechanism according to this invention.

FIGURE 3 shows another preferred embodiment of the gap mechanism of this invention. In FIGURE 3, tape 10 is again entrained over guide rollers 12, 14, 16, 20 and 22, over the tape write head 18 and is driven by a driving means 24, 26. The tape gap mechanism is shown as a rocker member 28' which is pivotally or rockably mounted on shaft or bearing 30'. Tape guide rollers 14 and 22 are rotatably mounted on rocker member 28' on opposite sides of shaft or bearing 30' and are also spaced on opposite sides of write head 18, as shown. As will be apparent, this mounting is very similar to the mounting previously discussed with reference to FIGURES 1 and 2. A spring 32' is connected between rocker member 28' and the tape recorder. In this embodiment, spring 32 is shown as a tension spring, although, of course, it will be apparent that the spring may be a compression spring if mounted in a different fashion.

A cam follower 34' is mounted on rocker member 28' and contacts rotatable cam 42 which is rotatable on a shaft 38'. As will be apparent the cam 42 will be driven by the driving means of the tape recorder in the same manner as previously mentioned with reference to FIGURE 1, such that the cam 42 will make one revolution for each recording on tape 10. Cam 42 has a drop 44 and is provided with a spiral shaped periphery, as shown. As will be apparent, when the cam follower 34' is moved over drop 44 on cam 42, guide rollers 14 and 22 will be shifted by the clockwise rocking of rocker member 28' to shift tape 10 forward over write head 18 to provide the desired spacing between adjacent recordings.

Figure 4:
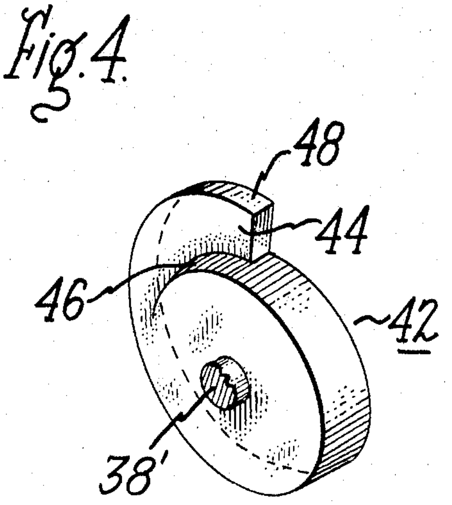
FIGURE 4 is a perspective view of the cam used in the preferred embodiment of FIGURE 3.
Figure 5:
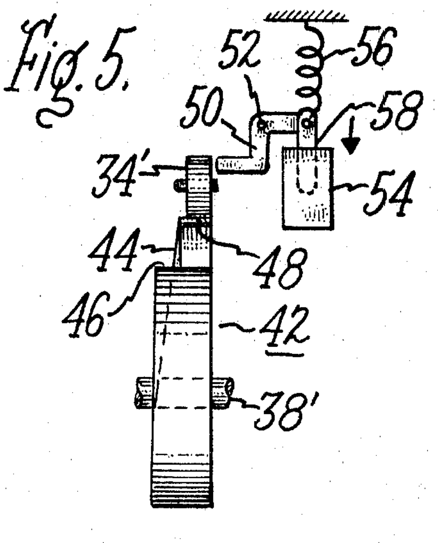
FIGURE 5 is an end view of the cam shown in FIGURE 4, showing a preferred means of moving the cam follower.

In the embodiment shown in FIGURE 3, cam 42 is a tapered cam, which is more clearly shown in perspective view in FIGURE 4 and end view in FIGURE 5. As shown in FIGURE 4, the periphery of cam 42 is tapered from the wide portion nearest the shaft 38' to the very narrow top portion 48. A shelf 46 is provided below narrow top portion 48, as shown. Shelf 46 is especially clearly shown in FIGURE 5. In order to provide for movement of cam follower 34' from top portion 48 to shelf 46 of cam 42, a lever 50 is provided. Lever 50 is pivoted about point 52 and is actuated by solenoid 54 to move or "kick" cam follower 34' from top portion 48. As shown in FIGURE 5, a spring 56, connected to arm 50 and solenoid arm 58 and a portion of the tape recorder, returns arm 50 to the position shown, after actuation by solenoid 54.

As will be understood, the solenoid 54, indicated in phantom lines in FIGURE 3, is energized at the end of each recording. This may be done by an end of data signal, which will energize the solenoid 54. As will be apparent the use of the solenoid 54 to actuate the gap mechanism relieves the close mechanical timing required by the cam 36 and cam follower 34 of the first embodiment.

As will be apparent from the previous description of the preferred embodiments of this invention, there is disclosed a gap mechanism which may be used to provide desired spacing between adjacent recordings on the tape in a tape recorder without in any way changing the recording driving speed of the tape recorder. As an example of one instance of use of the gap mechanism of this invention, a recorder was utilized to record approximately one thousand characters on approximately 5⅜" of tape as the tape was driven through the tape recorder. The characters were the reproduction of readings on a plurality of electrical meters. The tape advanced through the recorder at a linear speed of approximately 6⅛" each 75 seconds. This is the speed of the tape through the driving means 24, 26 of the recorder, as shown in the drawings. The tape 10 advances over the recording head 18 at approximately 5⅜" in 74.8 seconds recording the desired data, at approximately 200 characters per inch. At the end of the 74.8 seconds it is desired to obtain a spacing of ¾″ in the $\frac{2}{10}$ second before the beginning of the following recording. By using a cam follower drop that will produce approximately ⅜″ movement by guide roller 22 at the end of the 74.8 seconds, the cam 36 or 42 will be rotated to allow the cam follower 34 or 34′ to drop over the drop 40 or 44 a distance that will produce approximately ⅜″ movement by guide roller 22. This movement of the cam follower will rock the rocker member 28 or 28′ moving the guide rollers 14 and 22, ⅜″ in opposite directions. As previously discussed, this will provide a rapid movement of the tape 10 over the recording head 18 of approximately ¾″ in the $\frac{2}{10}$ second. During the following recording, the cam 36 or 42 then rotates to move rocker member 28 or 28′ at a constant rate back to its first position where it is again ready to provide a desired gap after the next recording. As will be apparent, the linear spacing of the gaps on the tape can be changed by changing the speed ratio between the cam drive and the tape drive. Thus, if it is desired to obtain a spacing after the recording of every 600 characters rather than every 1,000 characters, the cam 36 or 42 may be rotated at a more rapid speed to provide a complete revolution during the recording of, for example, each 600 characters. Obviously, it would be made to rotate slower, thereby providing a desired gap at the end of the recording of, for example, 1,200 characters or any other desired number of characters.

From the above it will be apparent that by means of this invention, a gap mechanism is provided which will provide desired spacing between adjacent recordings of a tape recorder. It will of course, be apparent to those skilled in the art that various changes may be made in the details herein before set forth without departing from the spirit and scope of the invention.

What is claimed as new and which it is desired to secure by Letters Patent of the United States is:

1. A gap mechanism for a tape recorder having a write head over which a tape is moved, comprising:

(a) a pair of tape guide rollers so spaced on each side of the write head as to form an open tape loop path with said write head in the bight of said loop path, (b) a rocker member mounted on a pivot point, (1) said guide rollers mounted on said rocker member and on opposite sides of said pivot point, (c) a cam follower, said cam follower mounted on said rocker member and displaced from paid pivot point, (d) and a rotating cam having at least one drop thereon, (1) said cam being rotated such that said cam follower drop coincides with the end of a recording on the tape of the recorder and, (e) a spring connected to said rocker member to maintain said cam follower in contact with said rotating cam, whereby as said cam follower drops on said rotating cam, said rocker member is rocked about its pivot point moving said guide rollers in opposite directions to pull the tape across the write head in the direction in which the tape is normally moved to thereby provide a gap between successive recordings.

2. A gap mechanism for a tape recorder having a write head over which recording tape is moved and drive means for driving the tape over the write head, said cap mechanism comprising:

(a) a rocker member mounted on a pivot on the tape recorder, (b) a cam follower mounted on said rocker member and displaced from said pivot, (c) a cam having a spiral contour with at least one abrupt drop on said contour, (1) said cam rotated by the tape drive so that said abrupt drop coincides with the end of a tape recording, (d) a spring member connected between said rocker member and the tape recorder to maintain said cam follower in contact with said cam, (e) and a pair of tape guide rollers, said guide rollers mounted on said rocker member on opposite sides of said pivot and so spaced on each side of the write head with the tape entrained over said guide rollers as to form an open tape loop path with the write head in the bight of said loop path.

whereby as said cam follower drops on said cam, said rocker member pivots about said pivot point moving said guide rollers in opposite directions to pull the tape rapidly past the write head in the direction in which the tape is normally moved to thereby provide a gap between successive recordings.

3. A gap mechanism as claimed in claim 2 in which said cam is a tapered cam having a side drop and a solenoid actuated arm is provided, said solenoid actuated arm actuated by an end of data signal at the end of a recording to move said cam follower over said abrupt drop on said tapered cam.

4. A gap mechanism as claimed in claim 2 in which said cam rotates to return said cam follower and said rocker member at a constant rate to position for providing a further gap during a recording following the drop of said cam follower on said cam.

5. A gap mechanism as claimed in claim 2 in which said cam is a tapered cam having a side drop, a solenoid is provided mounted on the tape recorder and energized by an end of data signal at the end of a recording, an arm pivotally mounted on said tape recorder and connected to said solenoid, said arm being actuated by said solenoid into contact with said cam follower to move said cam follower over said abrupt drop on said tapered cam.

References Cited

UNITED STATES PATENTS

| | | |
|---|---|---|
| 3,098,405 | 7/1963 | Lyon et al. |
| 2,914,619 | 11/1959 | Sweeney et al. |

LEONARD FORMAN, *Primary Examiner.*

R. A. FIELDS, *Assistant Examiner.*

U.S. Cl. X.R.

226—114